(12) United States Patent
Eiriksson et al.

(10) Patent No.: US 7,724,658 B1
(45) Date of Patent: May 25, 2010

(54) PROTOCOL OFFLOAD TRANSMIT TRAFFIC MANAGEMENT

(75) Inventors: Asgeir Thor Eiriksson, Sunnyvale, CA (US); Wael Noureddine, Mountain View, CA (US); Chris Yuhong Mao, Fremont, CA (US)

(73) Assignee: Chelsio Communications, Inc., Sunnyvale, CA (US)

( * ) Notice: Subject to any disclaimer, the term of this patent is extended or adjusted under 35 U.S.C. 154(b) by 953 days.

(21) Appl. No.: 11/217,661

(22) Filed: Aug. 31, 2005

(51) Int. Cl.
*G01R 31/08* (2006.01)
*H04J 3/16* (2006.01)
*H04L 12/42* (2006.01)

(52) U.S. Cl. ............... 370/229; 370/235.1; 370/230.1; 370/468; 370/451; 370/465

(58) Field of Classification Search ............ 370/230.1, 370/230, 465–467, 451–456, 235.1, 229, 370/412, 254; 709/230
See application file for complete search history.

(56) References Cited

U.S. PATENT DOCUMENTS

| | | | |
|---|---|---|---|
| 4,445,116 A * | 4/1984 | Grow ..................... 370/455 |
| 4,533,996 A | 8/1985 | Hartung et al. |
| 5,497,476 A | 3/1996 | Oldfield et al. |
| 5,778,189 A | 7/1998 | Kimura et al. |
| 6,087,581 A | 7/2000 | Emmer et al. |
| 6,226,680 B1 | 5/2001 | Boucher et al. ............ 709/230 |
| 6,240,094 B1 * | 5/2001 | Schneider ................ 370/412 |
| 6,247,060 B1 | 6/2001 | Boucher et al. ............ 709/238 |
| 6,334,153 B2 | 12/2001 | Boucher et al. ............ 709/230 |
| 6,389,479 B1 | 5/2002 | Boucher et al. ............ 709/243 |
| 6,393,487 B2 | 5/2002 | Boucher et al. ............ 709/238 |
| 6,397,316 B2 | 5/2002 | Fesas, Jr. |
| 6,401,177 B1 | 6/2002 | Koike |
| 6,427,171 B1 | 7/2002 | Craft et al. ................. 709/230 |
| 6,427,173 B1 | 7/2002 | Boucher et al. ............ 709/238 |
| 6,434,620 B1 | 8/2002 | Boucher et al. ............ 709/230 |
| 6,470,415 B1 | 10/2002 | Starr et al. ................. 711/104 |
| 6,510,164 B1 * | 1/2003 | Ramaswamy et al. ....... 370/466 |
| 6,591,302 B2 | 7/2003 | Boucher et al. ............ 709/230 |
| 6,594,268 B1 | 7/2003 | Aukia et al. |
| 6,625,671 B1 | 9/2003 | Collette et al. |
| 6,658,480 B2 | 12/2003 | Boucher et al. ............ 709/239 |
| 6,681,244 B1 | 1/2004 | Cross et al. |

(Continued)

OTHER PUBLICATIONS

Clark et al., "*An Analysis of TCP Processing Overhead*," IEEE Communications Magazine, Jun. 1989, pp. 23-29.

(Continued)

*Primary Examiner*—Kwang B Yao
*Assistant Examiner*—Candal Elpenord
(74) *Attorney, Agent, or Firm*—Beyer Law Group LLP

(57) ABSTRACT

Transfer of data is facilitated between at least one application and a peer via a network. Data destined for the peer is provided from the at least one application for transmission to the peer via the network. Modulation event tokens are managed, and protocol processing of the data with the peer is based in part on a result of the modulation event tokens managing such that protocol processed data is caused to be transmitted to the peer via the network nominally with desired data transmission rate characteristics. A result of the protocol processing step is fed back to the to the modulation event tokens managing. The desired data transmission rate characteristics may include, for example, shaping and pacing.

22 Claims, 3 Drawing Sheets

U.S. PATENT DOCUMENTS

| | | | |
|---|---|---|---|
| 6,687,758 B2 | 2/2004 | Craft et al. ............. 709/250 |
| 6,697,868 B2 | 2/2004 | Craft et al. ............. 709/230 |
| 6,701,372 B2 | 3/2004 | Yano et al. |
| 6,708,223 B1 | 3/2004 | Wang et al. |
| 6,708,232 B2 | 3/2004 | Obara |
| 6,717,946 B1 | 4/2004 | Hariguchi et al. |
| 6,751,665 B2 | 6/2004 | Philbrick et al. ......... 709/224 |
| 6,757,245 B1 | 6/2004 | Kuusinen et al. |
| 6,757,746 B2 | 6/2004 | Boucher et al. .......... 709/250 |
| 6,792,502 B1 | 9/2004 | Pandya et al. |
| 6,798,743 B1 | 9/2004 | Ma et al. |
| 6,807,581 B1 | 10/2004 | Starr et al. ............ 709/250 |
| 6,813,652 B2 | 11/2004 | Stadler et al. |
| 6,862,648 B2 | 3/2005 | Yatziv |
| 6,925,055 B1* | 8/2005 | Erimli et al. ........... 370/229 |
| 6,941,386 B2 | 9/2005 | Craft et al. ............. 709/250 |
| 7,031,267 B2* | 4/2006 | Krumel ................ 370/255 |
| 7,093,099 B2 | 8/2006 | Bodas et al. |
| 7,114,096 B2 | 9/2006 | Freimuth et al. |
| 7,133,902 B2 | 11/2006 | Saha et al. |
| 7,133,914 B1 | 11/2006 | Holbrook |
| 7,191,318 B2 | 3/2007 | Tripathy et al. |
| 7,239,642 B1 | 7/2007 | Chinn et al. |
| 7,254,637 B2 | 8/2007 | Pinkerton et al. |
| 7,260,631 B1 | 8/2007 | Johnson et al. |
| 7,284,047 B2* | 10/2007 | Barham et al. ........... 709/224 |
| 7,313,623 B2 | 12/2007 | Elzur et al. |
| 7,376,147 B2 | 5/2008 | Seto et al. |
| 7,408,906 B2 | 8/2008 | Griswold et al. |
| 7,453,892 B2* | 11/2008 | Buskirk et al. .......... 370/401 |
| 2001/0010046 A1 | 7/2001 | Muyres et al. |
| 2001/0021949 A1 | 9/2001 | Blightman et al. ....... 709/219 |
| 2001/0036196 A1 | 11/2001 | Blightman et al. ....... 370/465 |
| 2001/0037406 A1 | 11/2001 | Philbrick et al. ........ 709/250 |
| 2002/0039366 A1 | 4/2002 | Sano |
| 2002/0087732 A1 | 7/2002 | Boucher et al. .......... 709/250 |
| 2002/0091844 A1 | 7/2002 | Craft et al. ............. 709/230 |
| 2002/0095519 A1 | 7/2002 | Philbrick et al. ........ 709/250 |
| 2002/0156927 A1 | 10/2002 | Boucher et al. .......... 709/250 |
| 2002/0161919 A1 | 10/2002 | Boucher et al. .......... 709/238 |
| 2002/0191622 A1* | 12/2002 | Zdan ................ 370/401 |
| 2003/0035436 A1* | 2/2003 | Denecheau et al. ....... 370/452 |
| 2003/0140124 A1 | 7/2003 | Burns ................ 709/220 |
| 2003/0200284 A1 | 10/2003 | Philbrick et al. ........ 709/219 |
| 2003/0204631 A1* | 10/2003 | Pinkerton et al. ........ 709/249 |
| 2004/0003094 A1 | 1/2004 | See |
| 2004/0003126 A1 | 1/2004 | Boucher et al. .......... 709/250 |
| 2004/0028069 A1 | 2/2004 | Tindal et al. |
| 2004/0030745 A1 | 2/2004 | Boucher et al. .......... 709/203 |
| 2004/0042487 A1 | 3/2004 | Ossman |
| 2004/0054813 A1 | 3/2004 | Boucher et al. .......... 709/250 |
| 2004/0062245 A1 | 4/2004 | Sharp et al. ............ 370/392 |
| 2004/0062246 A1 | 4/2004 | Boucher et al. .......... 370/392 |
| 2004/0064578 A1 | 4/2004 | Boucher et al. .......... 709/236 |
| 2004/0064589 A1 | 4/2004 | Boucher et al. .......... 709/250 |
| 2004/0064590 A1 | 4/2004 | Starr et al. ............ 709/250 |
| 2004/0073703 A1 | 4/2004 | Boucher et al. .......... 709/245 |
| 2004/0078480 A1 | 4/2004 | Boucher et al. .......... 709/237 |
| 2004/0088262 A1 | 5/2004 | Boucher et al. .......... 705/65 |
| 2004/0100952 A1 | 5/2004 | Boucher et al. .......... 370/389 |
| 2004/0111535 A1 | 6/2004 | Boucher et al. .......... 709/250 |
| 2004/0117509 A1 | 6/2004 | Craft et al. ............. 709/250 |
| 2004/0158640 A1 | 8/2004 | Philbrick et al. ........ 709/230 |
| 2004/0158793 A1 | 8/2004 | Blightman et al. ....... 714/758 |
| 2004/0165592 A1 | 8/2004 | Chen et al. |
| 2004/0190533 A1 | 9/2004 | Modi et al. |
| 2004/0199808 A1 | 10/2004 | Freimuth et al. |
| 2004/0213235 A1 | 10/2004 | Marshall et al. |
| 2004/0240435 A1 | 12/2004 | Craft et al. ............ 709/250 |
| 2005/0071490 A1 | 3/2005 | Craft et al. ............. 709/230 |
| 2005/0083935 A1 | 4/2005 | Kounavis et al. |
| 2005/0120037 A1 | 6/2005 | Maruyama et al. |
| 2005/0122986 A1 | 6/2005 | Starr et al. ............ 370/412 |
| 2005/0125195 A1 | 6/2005 | Brendel |
| 2005/0135378 A1 | 6/2005 | Rabie et al. |
| 2005/0135412 A1 | 6/2005 | Fan |
| 2005/0147126 A1 | 7/2005 | Qiu et al. |
| 2005/0190787 A1 | 9/2005 | Kuik et al. |
| 2005/0216597 A1 | 9/2005 | Shah et al. |
| 2005/0259644 A1 | 11/2005 | Huitema et al. |
| 2005/0259678 A1 | 11/2005 | Gaur |
| 2005/0289246 A1 | 12/2005 | Easton et al. |
| 2006/0031524 A1 | 2/2006 | Freimuth |
| 2006/0039413 A1* | 2/2006 | Nakajima et al. ......... 370/521 |
| 2006/0075119 A1 | 4/2006 | Hussain |
| 2006/0080733 A1 | 4/2006 | Khosmood et al. |
| 2006/0133267 A1 | 6/2006 | Alex et al. |
| 2006/0168649 A1 | 7/2006 | Venkat et al. |
| 2006/0206300 A1 | 9/2006 | Garg et al. |
| 2006/0209693 A1 | 9/2006 | Davari et al. |
| 2006/0221946 A1 | 10/2006 | Shalev et al. |
| 2006/0281451 A1 | 12/2006 | Zur |
| 2007/0064737 A1 | 3/2007 | Williams |
| 2007/0070901 A1 | 3/2007 | Aloni et al. |
| 2007/0110436 A1 | 5/2007 | Bennett |
| 2007/0201474 A1 | 8/2007 | Isobe |
| 2008/0002731 A1 | 1/2008 | Tripathy et al. |
| 2008/0016511 A1* | 1/2008 | Hyder et al. ........... 718/105 |
| 2008/0043750 A1 | 2/2008 | Keels et al. |
| 2008/0232386 A1 | 9/2008 | Gorti et al. |

OTHER PUBLICATIONS

Woodside et al., "The Protocol Bypass Concept for High Speed OSI Data Transfer," Research Paper. Available at: http://citeseer.ist.psu.edu/cache/papers/cs/26104/http: zSzzSzwww.sce.carleton.cazSzftpzSzpubzSzcmwzSzbpjan90.pdf/woodside90protocol.pdf.

Rütsche et al., "TCP/IP on the Parallel Protocol Engine," High Performace Networking, (IV, C-14), Elsevier Science Publishers, B.V. North Holland 1993.

Thia et al., "High-Speed OSI Protocol Bypass Algorithm with Window Flow Control," IFIP WG6.4 Third International Workshop on Protocols for High-Speed Networks, Stockholm, Sweden, May 13-15, 1992, pp. 53-68.

Thia et al., "A Reduced Operation Protocol Engine (ROPE) for a Multiple-Layer Bypass Architecture," Protocols for High-Speed Networks IV, 4th IFIP International Workshop, Aug. 10-12, 1994, Vancouver, B.C., Canada, pp. 224-239.

Rütsche et al., "Architectures of Multimedia Communication Subsystems," IFIP Transactions; vol. C-23 archive, Proceedings of the IFIP TC6 International Conference on Information Networks and Data Communication table of contents, pp. 217-230, Year of Publication: 1994.

Dalton et al., "Afterburner: Architectural Support for High-Performance Protocols," http://www.hpl.hp.com/techreports/93/HPL-93-46.pdf, Jul. 1993, 18 Pages.

TRM Technologies, Inc., "L4/L7 Switching," Downloaded from http://www.trm.ca/pages/t-tech7.html on Feb. 16, 2006, 3 Pages.

Madsen et al., "Wireless Data Communication," Fall 2003 Presentation, Wireless Networks Division (WING), Allborg University.

Yocum et al., "Anypoint: Extensible Transport Switching on the Edge," Proceedings of the 4th USENIX Symposium on Internet Technologies and Systems, Mar. 26-28, 2003, Seattle, WA, USA.

International Search Report in PCT/US02/12679, dated Jul. 23, 2002.

Office Action in U.S. Appl. No. 10/474,500, mailed Oct. 4, 2007.

Office Action in U.S. Appl. No. 11/137,146, mailed Mar. 5, 2008.

Office Action in U.S. Appl. No. 11/137,140, mailed Feb. 5, 2008.

Office Action in U.S. Appl. No. 11/250,894, mailed Jun. 26, 2008.

Notice of Allowance in U.S. Appl. No. 10/474,500, mailed Jul. 1, 2008.

Allowed Claims from U.S. Appl. No. 10/474,500.

Office Action in U.S. Appl. No. 11/313,003, mailed Aug. 22, 2008.

Office Action in U.S. Appl. No. 11/330,898, mailed Oct. 8, 2008.
Office Action in U.S. Appl. No. 11/137,146, mailed Nov. 3, 2008.
Office Action in U.S. Appl. No. 11/356,850 mailed Dec. 3, 2008.
U.S. Appl. No. 60/690,465, filed Jun. 14, 2005.
U.S. Appl. No. 60/718,418, filed Sep. 19, 2005.
Office Action in U.S. Appl. No. 11/282,933 mailed Feb. 20, 2009.
Office Action in U.S. Appl. No. 11/250,894 mailed Jan. 26, 2009.
Office Action in U.S. Appl. No. 11/137,140 mailed Apr. 1, 2009.
Office Action in U.S. Appl. No. 11/130,898 mailed Apr. 2, 2009.
Office Action in U.S. Appl. No. 11/747,790 mailed May 12, 2009.
Office Action in U.S. Appl. No. 11/747,793 mailed Jun. 8, 2009.
Notice of Allowance in U.S. Appl. No. 11/313,003, mailed Jun. 8, 2008.
Allowed Claims from U.S. Appl. No. 11/313,003.
Pratt, Ian and Fraser, Keir, "Arsenic: A User-Accessible Gigabit Ethernet Interface," INFOCOM 2001. Twentieth Annual Joint Conference of the IEEE Computer and Communications Societies. Proceedings. IEEE, vol. 1, Issue , 2001 pp. 67-76 vol. 1.
Office Action in U.S. Appl. No. 11/137,146, mailed Jun. 23, 2009.
Office Action in U.S. Appl. No. 11/735,861, mailed Aug. 6, 2009.
Office Action in U.S. Appl. No. 11/137,140, mailed Aug. 21, 2009.
Office Action in U.S. Appl. No. 11/747,650, mailed Aug. 27, 2009.
Office Action in U.S. Appl. No. 11/250,894, mailed Sep. 15, 2009.
Notice of Allowance in U.S. Appl. No. 11/356,850, mailed Jun. 26, 2009.
Allowed Claims from U.S. Appl. No. 11/356,850.
Office Action in U.S. Appl. No. 11/282,933, mailed Sep. 9, 2009.
Notice of Allowance in U.S. Appl. No. 11/330,898, mailed Sep. 23, 2009.
Allowed Claims in U.S. Appl. No. 11/330,898.

* cited by examiner

PROTOCOL OFFLOAD TRANSMIT TRAFFIC MANAGEMENT

TECHNICAL FIELD

The present invention is in the field of protocol offload processing and, in particular, relates to transmit traffic management in correspondence with protocol offload processing.

BACKGROUND

Protocol offload processing is known. For example, an interface device may be provided to operate in coordination with a host, for protocol offload processing with a peer device across a network. For example, the protocol offload processing may be according to a Transmission Control Protocol (TCP) whereas communication across the network may be via high-speed Ethernet, such as 10 Gbps Ethernet.

SUMMARY

Transfer of data is facilitated between at least one application and a peer via a network. Data destined for the peer is provided from the at least one application for transmission to the peer via the network. Modulation event tokens are managed, and protocol processing of the data with the peer is based in part on a result of the modulation event tokens managing such that protocol processed data is caused to be transmitted to the peer via the network nominally with desired data transmission rate characteristics. A result of the protocol processing step is fed back to the modulation event tokens managing. The desired data transmission rate characteristics may include, for example, shaping and pacing.

BRIEF DESCRIPTION OF FIGURES

FIG. 1 illustrates an architecture of a flow processor to handle protocol offload processing and including data transmission modulation (traffic management) capability.

DETAILED DESCRIPTION

It is desirable that the protocol offload processing be capable of modulating the transmission of data across the network to have particular desired data rate characteristics. As a result, for example, the data transmission can be modulated based on characteristics of the network itself, such as round trip time (RTT). As another example, data transmission may also be modulated based on a desired peak transmission rate to, for example, operate to defined quality of service transmission characteristics for particular customers, smooth out (i.e., not propagate) jitter from a data source, and/or attempt to match the receive capabilities of receiving peer devices.

Figure 1:
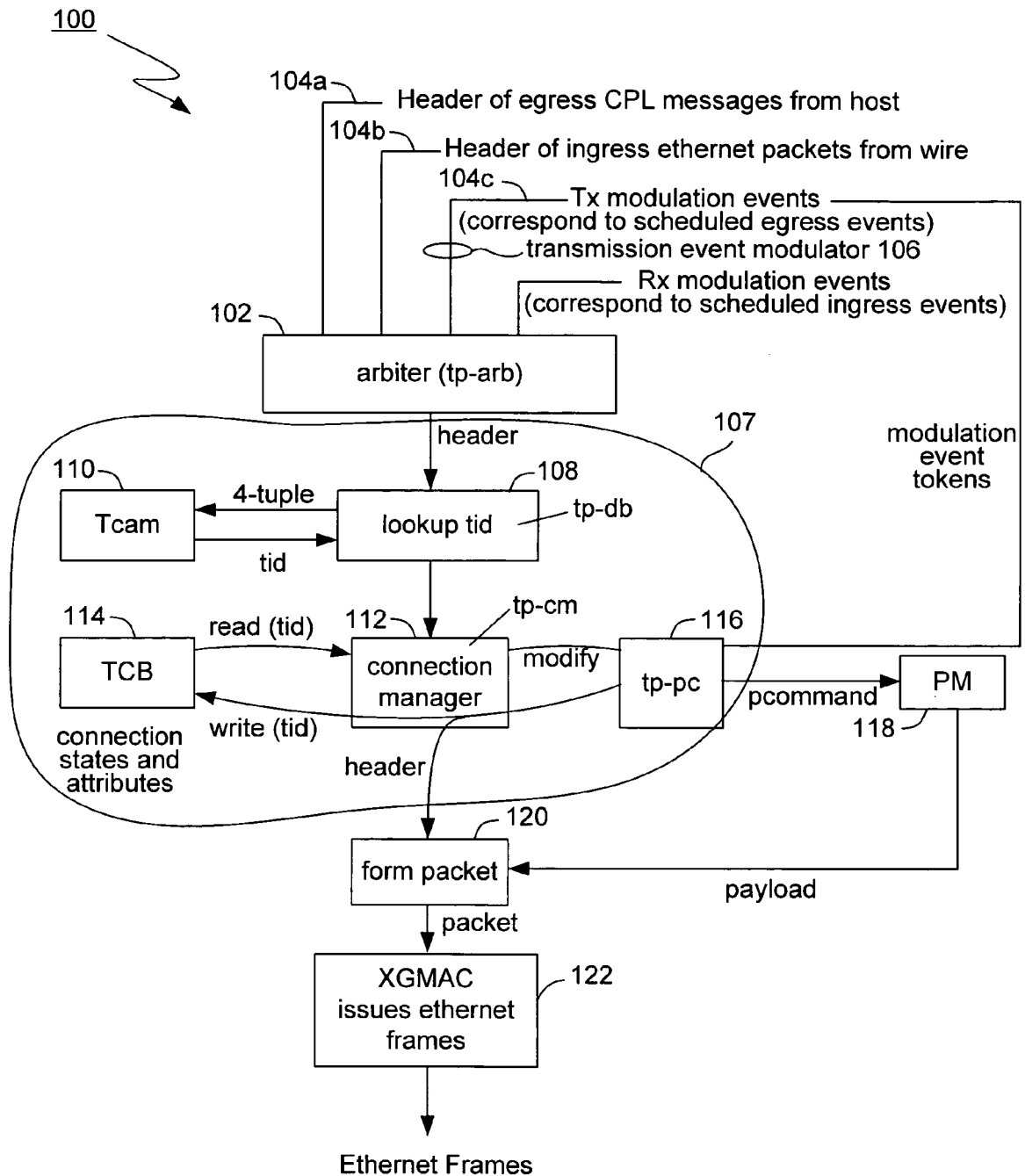
FIGS. 1-1 broadly illustrates modulating data transmission in protocol offload processing.
Figure 1:
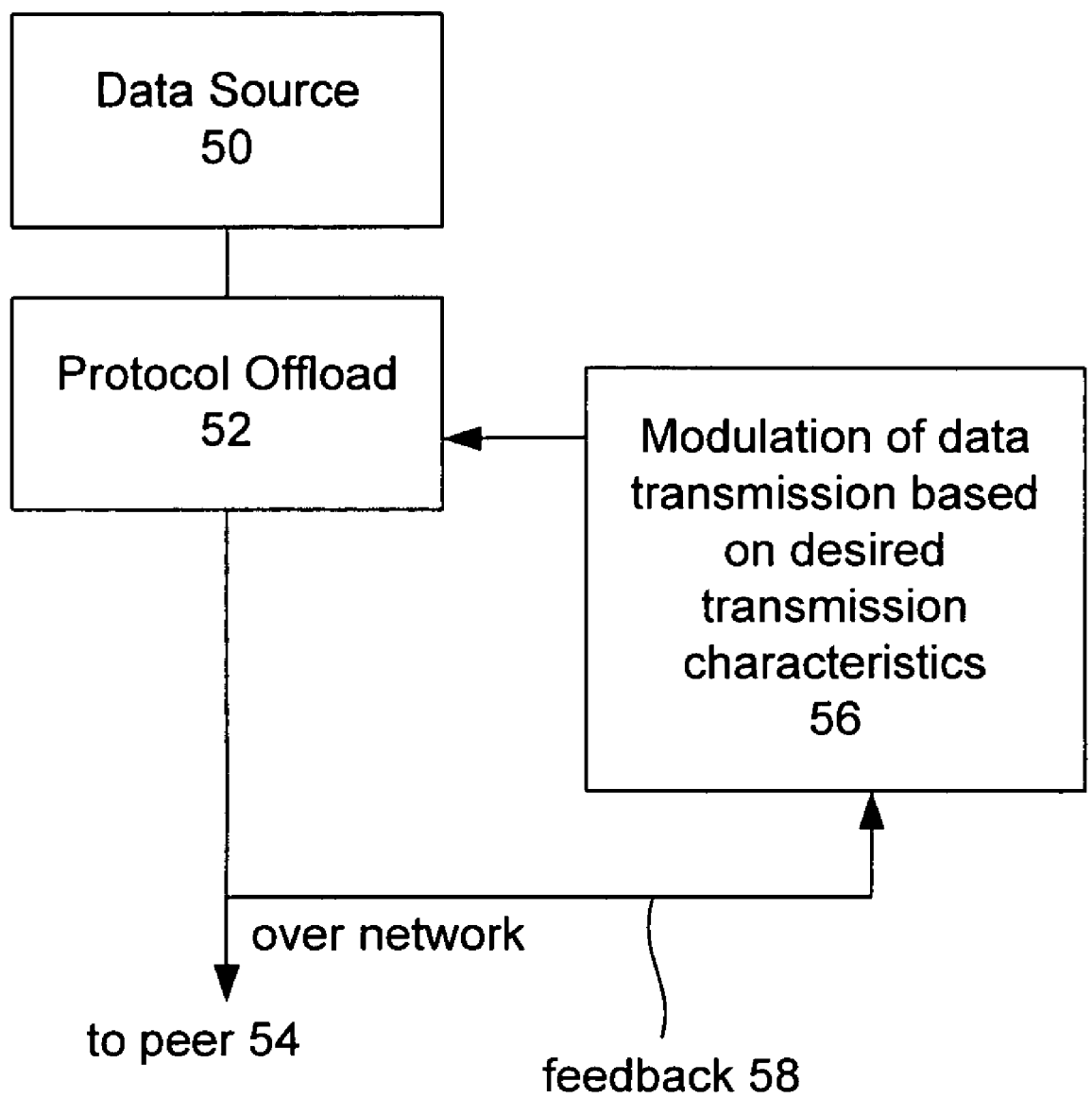

FIGS. 1-1 broadly illustrates modulating data transmission from protocol offload processing. A data source 50 is a source of data to be transmitted. For example, the data source 50 may be a host computer. A protocol offload processing device 52 (such as a network interface controller, or NIC) handles transmission of data, according to the protocol (such as, for example, TCP) to a peer 54 over a network. A data transmission modulator 56 controls the protocol offload processing (traffic management) according to desired data transmission characteristics and based on feedback 58 (e.g., modulation event tokens) from the protocol offload processing device 52 to the data transmission modulator 56.

Broadly speaking, the traffic management controls the delivery of data across the network to nominally have desired characteristics, and a transmission traffic management capability may be provided for protocol offload processing accomplished using various architectures. Typically, the desired characteristics for data delivery are provided from a host computer. In some cases, processing more closely associated with the protocol processing determines the desired characteristics, typically based at least partly on characteristics of the network.

We now describe a specific example of protocol offload processing and modulating the transmission of data across the network. In the specific example, a flow processor architecture for protocol offload processing is employed, and a traffic management capability manages the operation of the flow processor (or, at least, portions of the flow processor) to control the flow of data communication via the network between the protocol offload processing and peer devices. While the processor architecture in the described example is a flow processor architecture, other architectures (perhaps not even processors) may be employed.

Turning now to FIG. 1, the flow processor architecture of the interface device 100, having transmission traffic management capability, is described. An arbiter 102 arbitrates among various signals such as headers of control messages from a host (104a), data packets from the physical wire of the network (104b) and transmission modulation event tokens (104c). Before proceeding to describe the remainder of the FIG. 1 flow processor architecture, it is noted by way of introduction that the transmission modulation event tokens 104c, provided to the arbiter 102 via a transmission event modulator 106, are employed to modulate the transmission of data across the network from the protocol offload interface device. It is noted that the arbiter 102 is a feature of the particular flow processor architecture of the FIG. 1 device and would typically have only an indirect effect on the transmission traffic management capability.

When the arbiter 102 operates to allow a transmission modulation event through (the source of the transmission modulation event tokens, including the transmission event modulator 106, is discussed in detail later), the protocol header in the transmission modulation event is provided to a protocol processing block 107.

The protocol processing block includes a lookup block 108. A protocol header (including, for the TCP protocol, a 4-tuple) uniquely identifies a connection according to the protocol. The lookup block 108 operates to match the protocol header to an internal identification ("tid," used by the interface device and the host) corresponding to particular protocol connection states. In the FIG. 1 example, the lookup block 108 provides a TCP 4-tuple, which uniquely identifies the TCP connection, to a TCAM 110, and the TCAM 110 returns the tid for the unique TCP connection.

The lookup block 108 then provides the tid, received from the TCAM 110, to connection manager circuitry 112 that manages the connection state and attributes. In the FIG. 1 example, the connection state and attributes are in a TCP Control Block (TCB) 114. The connection manager 112 operates in concert with the payload command manager 116 to generate and provide payload commands to a payload manager block 118.

In particular, the connection manager provides the tid to the TCB 114, and the TCB 114 provides the current connection state and attributes for the connection (i.e., the connection to which the tid corresponds) to the connection manager 112. Based on the current connection state and attributes provided from the TCB 114, the connection manager 112 determines how to appropriately modify the connection state and provides, to the payload command manager 116, an indication of the modification to the connection state. Based on the indication of the modification, the payload command manager 116 issues one or more appropriate payload commands to the payload manager block 118. Furthermore, as appropriate based on the modified connection state and the availability of additional data to send for the connection, the payload command manager 116 provides transmission modulation event tokens to the transmission event modulator 106.

The connection manager 112 writes the modified connection state and attributes back into the TCB 114. The read, modify and write of the connection state and attributes is done in an atomic operation The connection manager 112 provides an appropriate packet header for data transmission to a form packet block 120. Meanwhile, the payload manager block 118 provides the corresponding payload to the form packet block 120 (as discussed above, based on payload commands from the payload command manager 116). The form packet block 120 combines the packet header and corresponding payload into a packet for transmission across the network. A network protocol block 122 forms appropriate units of data for transmission across the network. In the FIG. 1 example, packet data is transmitted across the network in an Ethernet-encapsulated manner, so the network protocol block 112 issues Ethernet frames for transmission across the network to a peer device.

As discussed above, the transmission modulation event tokens originate in the payload command manager 116 and are provided to the transmission event modulator 106. In the example discussed above, a transmission modulation event is provided to the transmission event modulator 106 as the ultimate result of the arbiter 102 operating to allow a transmission modulation event through. As another example, a transmission modulation event may be provided to the transmission event modulator 106 as the ultimate result of the arbiter 102 operating to allow through information received off the wire. For example, the information received off the wire may be a header of an ingress Ethernet packet that comprises, for example, an acknowledgement from a peer device indicating that data sent to the peer (such as peer 54 in FIGS. 1-1) has been successfully received (e.g., according to the TCP protocol).

More generally, the information received off the wire is information to indicate that, but for the transmission traffic management capability, data may be transmitted to the peer device. In some examples, the transmission of particular data is not to be managed (i.e., is not to be deferred). For example, if "duplicate ACKs" are received, this could indicate that data was received out-of-order. It would then be inferred that the gap is due to a drop and a "fast retransmit" of a segment would be performed. It may be preferable that transmission of this segment not be deferred. On the other hand, an received ACK that indicates successful receipt of data by the peer would generally not result in a modulation token event being provided to the transmission event modulator 106, since a modulation token event would typically be outstanding based on whether there was more data to be sent when the data corresponding to the received ACK was originally transmitted. Thus, in accordance with this aspect of shaping, an ACK does not cause transmission to be triggered.

Figure 2:
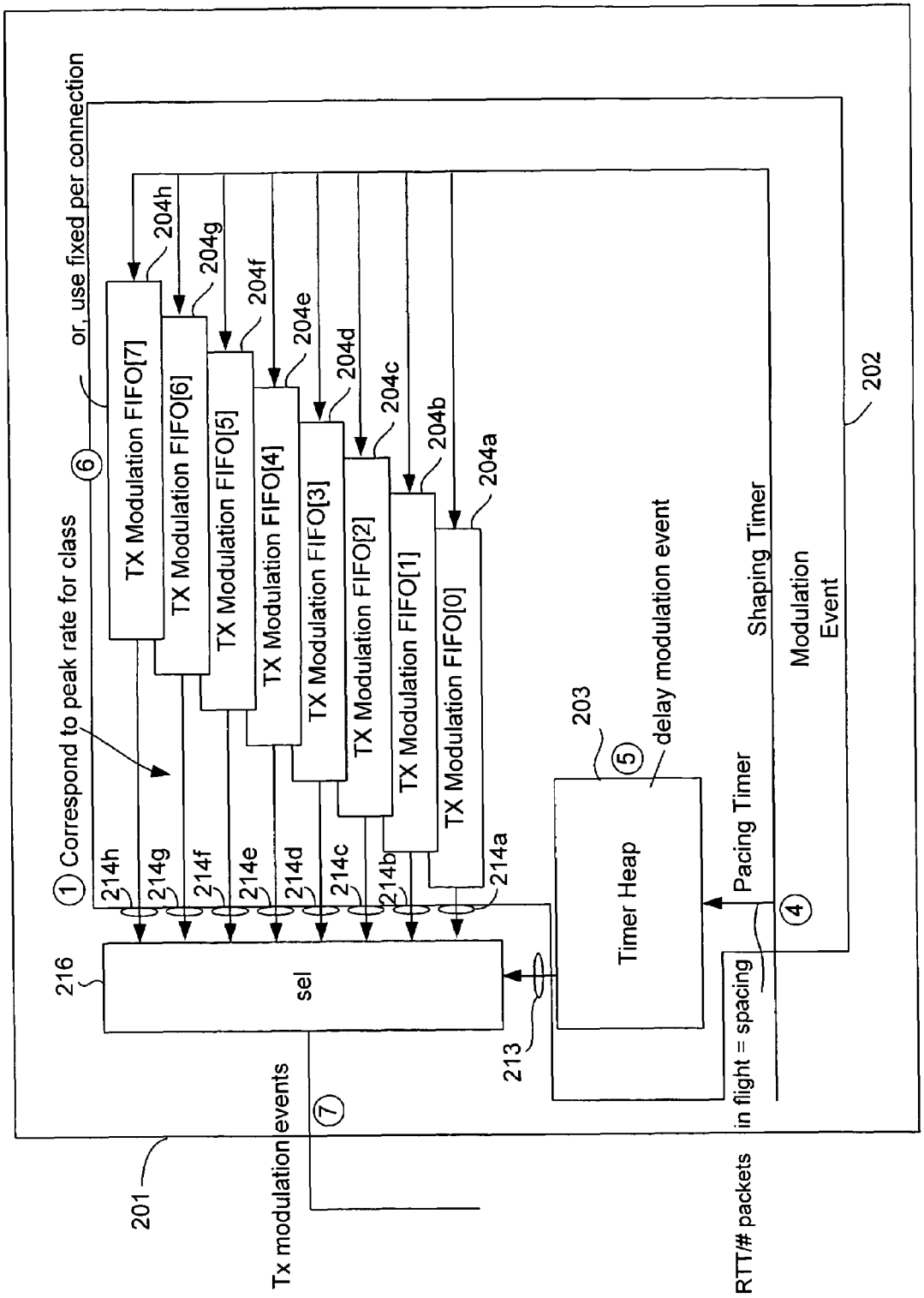
FIG. 2 illustrates a more detailed example of the traffic management portion of the FIG. 1 architecture.

We now discuss operation of a detailed example of the transmission event modulator 106, with specific reference to the FIG. 2 transmission event modulator 201 (an example of the transmission event modulator 106 in FIG. 1) and also with reference to FIG. 1. Before describing FIG. 2 in detail, however, we first discuss some general aspects of data transmission modulation. In general, the data transmission modulation discussed here relates to scheduling packet transmissions according to one or more desired data rate characteristics.

For example, "pacing" refers to the sender spacing the packet transmission when the RTT (Round Trip Time) is large. Thus, for example, pacing can be used to minimize burstiness. For example, high speed long delay links may require very large send and receive windows. A default sending pattern is typically bursty. That is, some packets may be closely spaced on the wire, which can result in overflows at intermediate switches and routers. This can be particularly problematic for satellite links, where the buffering resources in the satellites may be extremely limited, even though the RTT is large. With TCP pacing, in general, the transmission of packets are distributed in a window across the RTT.

In contrast to pacing, shaping limits the peak rate at which data is transmitted over the network for a particular connection or class of connections. This capability has potentially many uses. For example, shaping can be used to provide different quality of service for different customers, based on an amount the customers pay, for example.

Shaping can also be useful when data coming from a source is inherently jittery. For example, an application reading data from disk storage may provide data with jitter (e.g., there may be bursts in the data when a read head has been moved over the data to be read). As another example, when a server is connected to a very high speed link (e.g., 10 Gbps) serving clients connected to 10/100 Mbps or even 1 Gbps links, data may be sent from the server to the clients up to 1,000 times faster than the client links can handle. In such a case, congestion and packet loss can result.

Yet another example area where shaping can be useful is when a server is connected to a high performance networked striping filing system, where the server generates a multi-gigabit I/O stream to be striped over multiple disks, and each disk can only handle a 1-3 Gbps stream depending on the type of the disk. If the data transmission rate exceeds the rate the disk can handle, packet loss will probably result.

Thus, in general, shaping can be used to limit the maximum data transmission rate to accommodate characteristics of the link (including endpoints) or to impose characteristics on the transmissions, even if not to accommodate characteristics of the link.

We now discuss FIG. 2 in some detail. Referring to FIG. 2, a transmission event modulator 201 (as discussed above, a specific example of the FIG. 1 transmission event modulator 106) includes a data structure 202 provided to hold transmission modulation event tokens sent by the payload command manager 116 to the transmission event modulator 201.

In the FIG. 2 example, the data structure 202 includes a heap 203 usable for providing a pacing function, whereas the FIFO's 204*a* through 204*h* (generally, 204) are usable for providing a shaping function. In general, then, modulation event tokens are stored into the appropriate portion of the data structure based on desired data transmission characteristics for the connection to which the modulation event token corresponds. For example, each FIFO 204 may correspond to a different Quality of Service promise.

Heap timer 213, in association with the heap 203, accomplishes the pacing function. Timers 214*a* through 214*h*, in association with FIFO's 204*a* through 204*h*, respectively, accomplish the shaping function. Notwithstanding the accomplishment of the pacing function and the shaping function as just discussed, the selector 216 is configured to enforce arbitration (e.g., priority-based or round robin) among those data modulation event tokens that are ready to "graduate" from the transmission event modulator 201. The characteristics of the pacing and shaping are configurable using messages passed between the host and the interface device. We now discuss pacing and shaping in greater detail.

With regard to pacing, when the transmission protocol is TCP, one way to spread the packet transmissions over an RTT, when the send window (snd_wnd) is larger than 2 MSS (Maximum TCP Segment Size), is to configure the heap timer 213 to schedule the transmission of the next packet (i.e., schedule the release of the next transmission modulation event from the heap 203) according to:

RTT/(snd_wnd/MSS) [in TCP ticks]

In one example, the value of the heap timer 213 is maintained as eleven bits and, therefore, the maximum inter-packet spacing is 2095 TCP ticks. (In terms of core clock cycles, one TCP tick is 2 to the power of the timer resolution setting). Thus, the timer tick may be chosen to allow a range typically sufficient for pacing, while keeping the maximum sampled RTT value (which, in this example, is limited to $2^{16}$ times the timer tick) greater than the expected maximum network RTT (10 times that value, in this example).

In one example, the heap timer 213 operates to use a delta time value to trigger a timer event. Each transmission modulation event includes an indication of the connection for which the heap timer 213 is triggered, e.g., the tid (for the TCB 4-tuple, when the connection is a TCP connection). As discussed above, the transmission modulation event is used to fetch the TCB state, which in turn dispatches a TCP packet, and schedules another transmission modulation event (an entry in the heap 203, for paced connections) if there is more data to send for the particular connection.

If the traffic management was absent, the protocol processing step would determine an amount of data to be subsequently transmitted. With traffic management, this determination becomes an estimate that is provided with the token back to the transmission event modulator. The modulation may occur based in part on this estimate. When transmission actually occurs, the actual amount of data transmitted may be different from the estimate, since the estimate was based on the state at the time it was determined and the state may change before the transmission actually occurs.

One useful effect of pacing is to reduce "burstiness" during fast ramp up (e.g., in the slow start phase of TCP flow-control). As the receive window of the connection opens up, the computed inter-packet delay decreases and may eventually reach zero, and the pacing function is effectively disabled.

We now discuss shaping. In one example, there are two types of shaping FIFO's. One type of shaping FIFO provides control over the inter-packet delay for a group (class) of connections, while the second type provides control over the inter-packet delay within a single connection. In one example, all event tokens for a particular FIFO cause the same inter-packet delay (i.e., out of that FIFO), so only one inter-packet delay is supported by each FIFO.

The mapping of connections to FIFO's determines the shaping type (per-class or per-connection). The first type of shaping (per class) may be accomplished by having a single FIFO (modulation queue) being configured to hold modulation event tokens for connections in a single group. The second type of shaping (per connection) may be accomplished by having a single FIFO configured to hold modulation event tokens for a single connection. Each token has associated with it an indication of a time to graduate the token out of the FIFO. For example, the time indications may be a graduation time, such that the delay associated with each event in the FIFO (where each event in the FIFO corresponds to a different connection, each connection being in the same class) from the immediately previous event in the FIFO, is substantially the same. The overall effect is that data for each connection is transmitted at the same fixed rate, whereas the first type of shaping realizes a fixed rate on a per-class basis.

In some examples, triggering of a timer associated with the heap 203 or a FIFO 214 means only that a modulation event in the heap 203 or the FIFO 214 is ready to graduate out of the heap 203 or the FIFO 214 and into the arbiter 102 (FIG. 1), not that the modulation event actually does so graduate. That is, as mentioned above, and as discussed in greater detail below, in some examples, an arbiter/selector 216 is provided at the output of the heap 203 and the FIFO's 214 to arbitrate among those modulation event tokens that are ready to graduate. The arbiter 216 may be configured according to, for example, a priority scheme, round robin scheme, or other arbitration scheme.

For example, a weighted round robin scheme may be employed, where the weight for a modulation event varies according to how much data there is to send for the connection or group of connections corresponding to that modulation event.

It is noted that the described traffic management scheme has applications broader than just offloaded protocol processing. Thus, for example, while FIGS. 1-1 shows protocol offload block 52, the modulation block 56 may be implemented in conjunction with protocol processing more generally. For example, the protocol processing may be implemented as part of a host. Thus, for example, the host may be executing applications corresponding to connections maintained by a protocol processing stack (or other protocol processing implementation) on the host. As another example, protocol processing may be distributed among the host and an offload mechanism. As yet another example, only the traffic management may be offloaded, with the protocol processing occurring on the host.

Furthermore, while the TCP protocol has been provided as an example, the traffic management scheme may be employed with other protocols, whether existing now or in the future. Examples of such other protocols are UDP (e.g., with video on demand applications) or STCP, which is currently being advanced as a replacement to the TCP protocol.

It should also be noted that the traffic management scheme does not require that the modulation events directly result in or from, or be part of protocol processing. For example, it is possible to space out the transmissions of already protocol processed packets to achieve a desired data rate by scheduling modulation events which are "graduated" in relation to the size of each packet to be sent.

What is claimed is:

1. A method to facilitate the transfer of data between at least one application and a peer via a network using a protocol processing mechanism, wherein data destined for the peer is provided from the at least one application, operating on a host, for transmission to the peer via the network, the data encapsulated in data packets formed using the protocol processing mechanism, according to a particular transmission protocol, comprising:

managing a data structure of tokens, each token including an estimate of an amount of data in the data packets to be transmitted, the step of managing the data structure including retrieving tokens out of the data structure based on the included estimate of an amount of data in the data packets to be transmitted and based on desired data transmission rate characteristics;

for each token retrieved out of the data structure, protocol processing with the peer, by the protocol processing mechanism according to the particular transmission protocol, to encapsulate data provided from the at least one application into a data packet and to cause the data packet to be transmitted to the peer via the network, such that data packet transmission to the peer via the network is modulated to nominally have desired data transmission rate characteristics; and feeding back a result of the protocol processing step to cause a token to be stored into the data structure of tokens.

2. The method of claim 1, wherein:
the tokens data structure managing step includes categorizing the tokens, such that each category of tokens corresponds to a separate desired date rate transmission characteristic indication.

3. The method of claim 2, wherein:
at least some of the desired data transmission rate characteristic indications indicate at least one of a group consisting of a desired shaping characteristic and a desired pacing characteristic.

4. The method of claim 2, wherein:
the tokens data structure managing step includes retrieving the tokens from the data structure wherein the tokens in each category are retrieved with a timing that corresponds to the desired data transmission rate characteristic indication to which that category corresponds.

5. The method of claim 4, wherein:
notwithstanding the desired rate transmission characteristic indications, the step of retrieving the tokens from the data structure is additionally subject to priority processing based on priorities associated with the categories.

6. The method of claim 5, wherein:
the priorities associated with the categories are based at least in part on an amount of data to be transmitted for the separate categories.

7. The method of claim 1, wherein:
the data structure includes a plurality of portions, each portion corresponding to a separate desired data rate transmission characteristic; and
the tokens data structure managing step includes separately managing the retrieving of tokens out of each portion of the data structure based on the separate desired data transmission rate characteristic to which that portion of the data structure corresponds.

8. The method of claim 7, wherein:
the priorities associated with the data structure portions are based at least in part on an amount of data to be transmitted with the indicated desired transmission rate characteristics.

9. The method of claim 1, wherein:
the method is accomplished by at least one of the group consisting of an intelligent interface device coupling a host, on which the at least one application is executing, to the network; and
processing on a host, on which the at least one application is executing.

10. The method of claim 9, wherein the tokens data structure managing step is accomplished by an intelligent protocol processing offload device that interoperates with the host.

11. The method of claim 1, wherein:
the protocol processing step includes processing information received from the network and, based thereon, determining whether to provide a token to the tokens data structure.

12. The method of claim 11, wherein:
the information received from the network includes an acknowledgement originating from the peer that data has been successfully received by the peer.

13. The method of claim 12, wherein:
based on the information received from the network, including an acknowledgement originating from the peer that data has been successfully received by the peer, not deferring the transmission of data without necessarily providing a token to the tokens data structure.

14. The method of claim 1, wherein:
in association with the protocol processing of data with the peer, determining whether transmission of particular data to the peer should not be deferred, and
based on a result of the determination of whether transmission of particular data to the peer should not be deferred, controlling whether a result of the protocol processing step is fed back to cause a token to be provided to the data structure of tokens.

15. The method of claim 14, wherein:
the protocol processing step includes processing information received from the network, and,
the step of determining whether transmission of particular data to the peer should not be deferred is based on a result of processing the information received from the network.

16. The method of claim 15, wherein:
the protocol processing step includes TCP, and
determining whether transmission of particular data to the peer should not be deferred includes processing the information received from the network to determine if at least part of the data to be transmitted to the peer has previously been transmitted.

17. The method of claim 16, wherein:
if it is determined that at least part of the data to be transmitted to the peer has previously been transmitted, determining that the transmission of the particular data to the peer should not be deferred.

18. The method of claim 1, wherein:
the token provided to the tokens data structure includes a parameter indicative of the estimated amount of data to be transmitted in association with processing the token by the protocol processing step.

19. The method of claim 18, wherein:
the protocol processing step includes processing to modify the amount of data to be transmitted based on a then-current state when the token is actually processed.

20. A method to facilitate the transfer of data between at least one application and a peer via a network, wherein data destined for the peer is provided from the at least one application for transmission to the peer via the network, comprising:
protocol processing of the data with the peer, such that protocol processed data is formed into packets to be transmitted to the peer via the network;
managing tokens;
processing tokens, to cause the protocol processing to form said data packets for transmission out to the network; and
feeding back a result of the tokens processing step to cause a token to be provided to the tokens managing step,
wherein at least some of the tokens provided to the tokens managing step includes information that is based at least in part on information received by the protocol processing step from the network; and
wherein the tokens processing step considers the information included in at least some of the tokens, that is based at least in part on information received by the protocol processing step from the network.

21. The method of claim 20, wherein:
the feedback from the token processing step results in said data packets being transmitted out to the network at a nominal rate.

22. The method of claim 20, wherein:
the token processing step includes the determination of the size of each packet.

* * * * *